US005188159A

United States Patent [19]

Lush

[11] Patent Number: 5,188,159

[45] Date of Patent: Feb. 23, 1993

[54] WEDGE

[76] Inventor: Craig L. Lush, 8148 Cliffview Ave., Springfield, Va. 22153

[21] Appl. No.: 560,778

[22] Filed: Jul. 31, 1990

[51] Int. Cl.[5] .......... B27L 7/00; A47J 49/02

[52] U.S. Cl. .......... 144/193 D; 144/193 R; 254/104

[58] Field of Search .......... 254/104; 144/193 A, 144/193 C, 193 D, 366

[56] References Cited

U.S. PATENT DOCUMENTS

| | | | |
|---|---|---|---|
| 2,691,512 | 10/1954 | Arizio | 254/104 |
| 2,814,475 | 11/1957 | Jay | 144/193 D |
| 3,377,052 | 4/1968 | Hagen | 254/104 |
| 3,868,748 | 3/1975 | Kelly | 254/104 |
| 4,295,506 | 10/1981 | Nicholson | 144/193 D |
| 4,299,347 | 11/1981 | Rougier | 254/104 |

FOREIGN PATENT DOCUMENTS

| | | | |
|---|---|---|---|
| 1045360 | 6/1953 | France | 144/193 D |
| 488290 | 12/1953 | Italy | 144/193 D |

*Primary Examiner*—W. Donald Bray

[57] ABSTRACT

A typical wood splitting wedge which has been modified to provide a retractable penetrating point capable of being extended beyond the wedges cutting edge to assist in the introduction the wedge into the grain of the wood.

1 Claim, 6 Drawing Sheets

WEDGE

BACKGROUND

1. Field of Invention

This invention relates to wedges, specifically to mechanized wedges utilized primarily for splitting wood.

2. Discussion of Prior Art

Heretofore, when using a wedge to split a log, one introduced the cutting edge of the wedge into the log by manually holding the wedge perpendicular to the surface to be entered, and using a sledge hammer or similar item in the other hand, "starting"(driving the wedge far enough into the log to be self-supporting) the wedge. Once the wedge had been properly "started", one continued to hammer on the wedge, using the force developed by the hammer to propel the wedge deeper and deeper into the wood until ultimately the log would split apart.

This technique has several shortcomings. Specifically, starting the wedge by holding it with one hand and using an unwieldy sledge (usually 8 to 12 lbs.) in the other, attempt to hit the wedge with enough force and at a proper angle to cause the wedge to enter the wood and remain stable. Obviously this technique requires both hands to move simultaneously, but at different rates, and ultimately in different directions. The hand equipped with the sledge moves rapidly toward the wedge and, upon impact, slows dramatically while it attempts to drive the wedge forward, then recoils to dissipate the energy not consumed by the wedge. The other hand is attempting to maintain stability and positioning of the wedge prior to impact, guide and stabilize the wedge upon impact, and protect itself from harm should the sledge be slightly or grossly misdirected. A slight misdirection of the sledge can result in misalignment and/or incomplete insertion. Gross misdirection can result in serious injury. Unfortunately, this injury can be severe because of the effort, or force, necessary to "start" a wedge of conventional design and construction. Significant "force" is necessary because the traditional wedge must be "started" by driving the entire length of the cutting edge into the wood. Obviously, this "force" is a function of among other things the angle, width and length of the cutting edge, as well as the density, moisture, overall length and stability of the log to be penetrated. Anything less than ideal conditions and accomplished skill results in a wedge that only partially enters the wood (dangerously springing out upon a future, more forceful impact), or enters the wood at anything other than a perpendicular angle (which would dangerously deflect a full force sledge blow toward an adjacent object or worse yet the operator), or bounces out of the wood leaving the operator to control a reeling sledge in one hand while simultaneously trying to avoid the ricocheting, sharpened wedge.

Prior Art has recognized the inadequacies of current practices and in U.S. Pat. No. 4,295,506 to Nicholson, Oct. 20, 1981 attempted to deal with the situation by adding a short, fixed starting point to the center of the cutting edge of the wedge in hopes of minimizing the problem. Unfortunately, this technique, though a fairly inexpensive addition to the typical wedge, also has several inherent shortcomings. First, the starting point is formed of the same material and we would assume at the same time as the wedge itself. Being integral to the forged body of the wedge, as this point is worn or should it become damaged, the wedge has been reduced to the capability and susceptibility of its ancestors. Additionally, the Nicholson design provides an opportunity for injury should the operator inadvertently allow a finger to rest within the standoff that exists between the top of the log and the cutting edge of the wedge prior to the first "starting" blow. Should this happen, the blow from the sledge would cause the finger to be jammed between the sharpened, cutting edge of the wedge and the top surface of the log. Serious injury could result.

OBJECTS AND ADVANTAGES

Accordingly, several objects and advantages of my invention serve to minimize the problems that previously existed. This is accomplished by modifying a standard "wedge", comprised of two planes that lie at acute angles to each other, with the addition of a cylindrical rod, parallel to, and centered on the longitudinal axis of the wedge. Subject rod, comprised of a finite length and therefore having two ends, is equipped with a point at the end closest to the apex, or cutting edge of the wedge (to facilitate being driven into the log), with the second and opposite end having a small chamfer (to minimize the deformation caused by the periodic impact of the sledge). Subject rod is longer overall than the overall length of the wedge and traverses within the body of the wedge via a race of slightly larger interior diameter than the outside diameter of subject rod. The "normal" or "at rest" position of subject rod is with the chamfered end of the rod extending above the portion of the wedge body that is used as a striking surface, with the opposite, pointed end of subject rod equal to but not extending beyond the line (or arc) formed by the cutting edge of the wedge. The pointed portion of subject rod is of a design to facilitate being driven into the log, much the way a large nail or spike would be pointed. A helical spring surrounding a portion of subject rod and held in minor compression between wedge body transverse cutout closest to the cutting edge and a transversely mounted retaining pin pressed perpendicularly into subject rod, serves to keep subject rod in its "normal" or "at rest" position. Operation of my improved wedge minimizes or eliminates many of the shortcomings of the prior art. The process of "starting" the wedge now consists of holding the wedge body and using the same sledge hammer or similar device, gently driving subject rod into the wood. As this occurs, the body of the wedge remains stationary, thus eliminating one of the most serious defects in the prior art, specifically the possibility of inadvertently placing a finger in the standoff between the cutting edge of the wedge and the wood, prior to the first or "starting" blow. Secondly, traditional wedges and prior art all required the first or "starting" blow to be accompanied by movement of the wedge at sledge impact. With the wedge modifications provided by my invention, this is no longer the case. The wedge body remains stationary as subject rod penetrates the wood. This stationary wedge body minimizes the difficulty of maintaining proper positioning and alignment of the wedge. Additionally, the "force" necessary to "start" the wedge has been greatly reduced since it is no longer necessary to drive the entire cutting edge of the wedge into the wood, only the point of subject rod. Since force is a major factor in the severity of injury should one mis-strike the wedge with the hammer, the less force that is required during the "starting" of the wedge the lesser the chance of serious injury. After the wedge has been properly "started" the operator can stand at a safer distance and use additional force, knowing that the wedge is being held, first, by the friction between the displaced wood fibers and subject rod, and second, by the force of the partially compressed spring, which is holding the cutting edge of the wedge firmly against the surface to be split. Standing at this safer distance from the impact area, with both hands firmly controlling the sledge hammer or similar device, the operator can safely apply the force necessary to efficiently split the wood. Next, the design of my invention minimizes the wear and breakage problem inherent in the integral "starting" point design of the prior art. Unlike the prior art, whose usefulness will ultimately be negated by the wear or breakage of the "starting" point, the components of my invention may be disassembled for sharpening of subject rod, or dressing the wedge striking surface that tends to mushroom from the impact of a sledge after extensive use, or to replace any part should it become unserviceable. It is obvious that my invention minimizes or eliminates many of the shortcomings of the prior art.

Further objects and advantages of my invention will become apparent from a consideration of the drawings and ensuing description of it.

LIST OF REFERENCE NUMERALS

Figure 1:
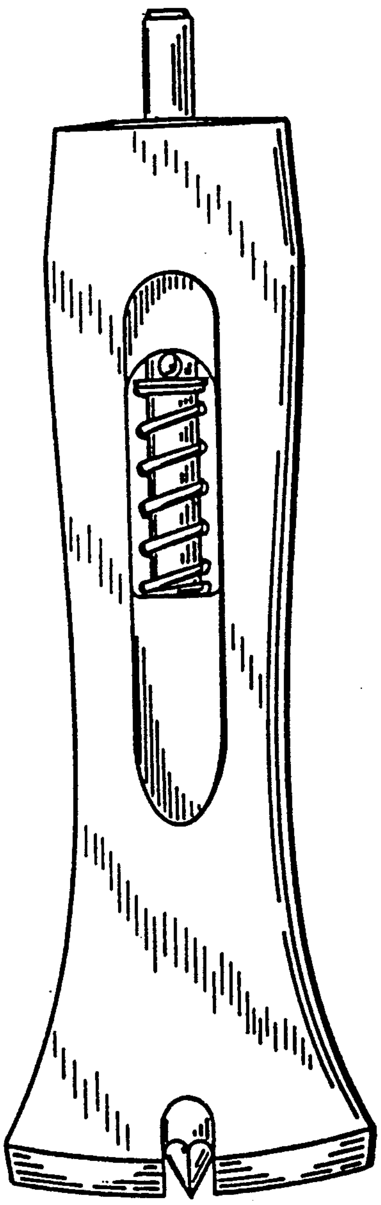
FIG. 1 is a front view of my invention.
Figure 2:
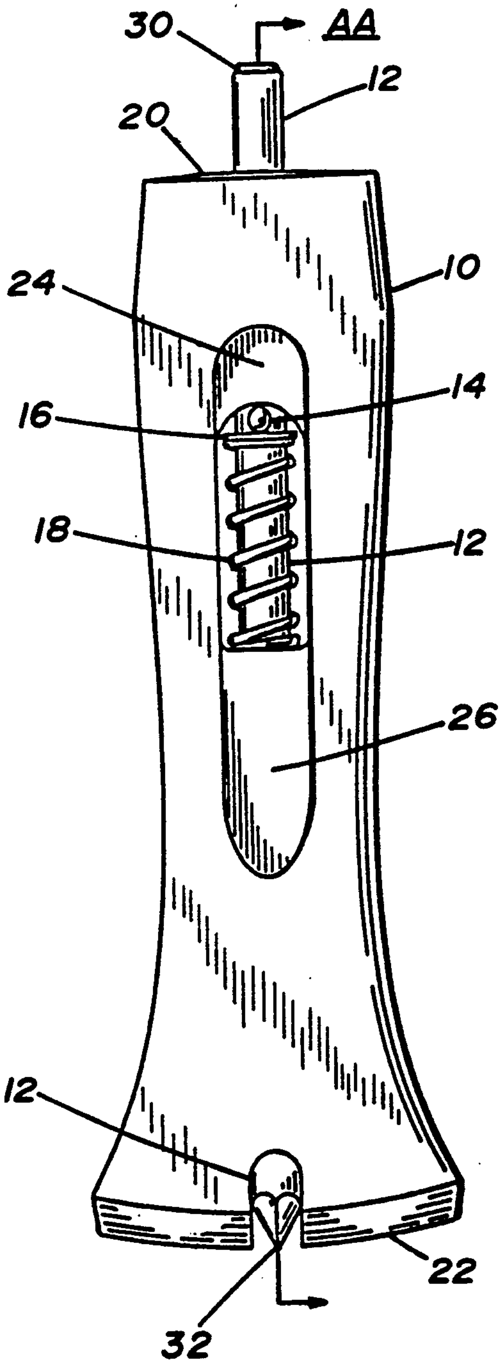
FIG. 2 is a front view of my invention (with reference numerals).
Figure 3:
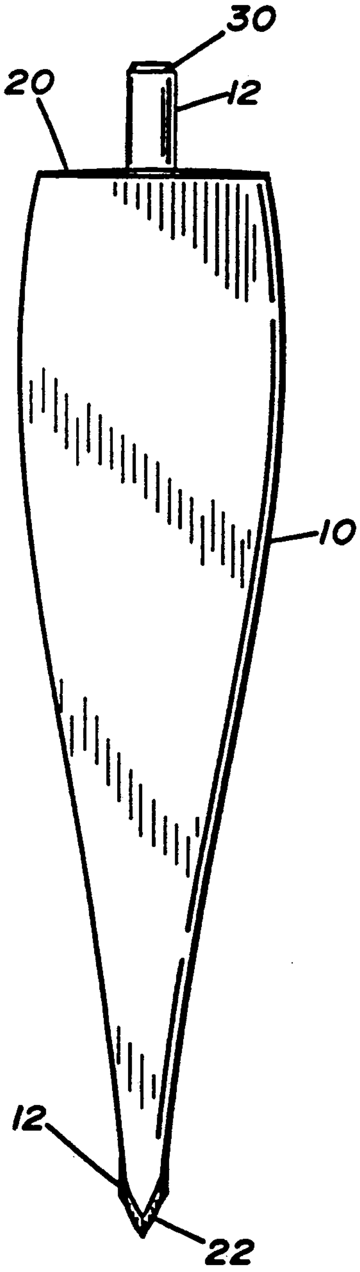
FIG. 3 is a side view of my invention
Figure 4A:
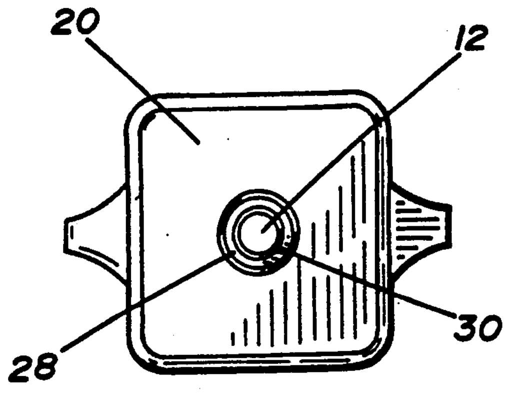
FIG. 4 contains top and bottom views of my invention.
Figure 4B:
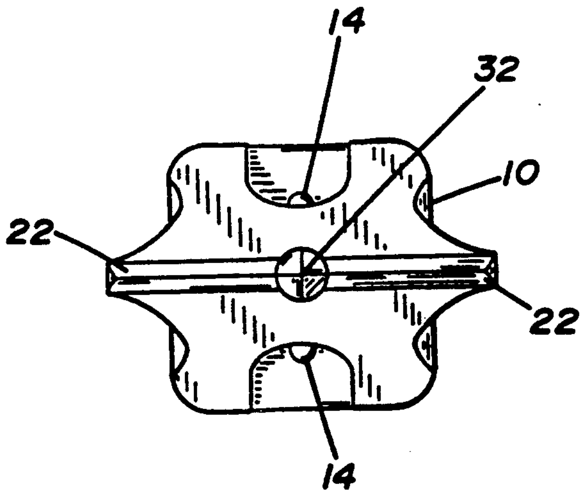
Figure 5:
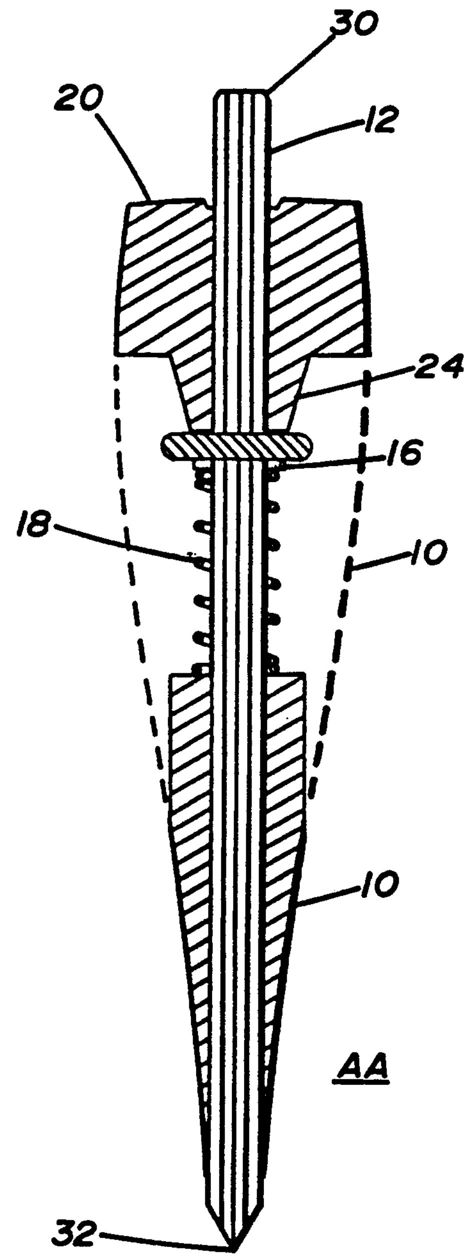
FIG. 5 is a detailed cross section (sideview) with penetrating rod at rest.

10: Wedge body
12: Penetrating rod
14: Retaining pin
16: Steel washer
18: Helical compression spring
20: Wedge body striking surface
22: Wedge body cutting edge
24: Wedge body clearance cut striking end
26: Wedge body clearance cut cutting end
28: Wedge body striking surface clearance cut
30: Penetrating rod chamfer
32: Penetrating rod point.

DESCRIPTION OF INVENTION

As shown in FIGS. 1–6, my invention modifies the typical wedge body (10) by providing a hole concentric to the centerline of the longitudinal axis beginning at the center of the striking surface (20) of the wedge body (10) and extending through the wedge body and ending at the center of the cutting edge (22) of the wedge. A second, transverse hole is provided, perpendicular to said longitudinal hole, starting at one of the wedge faces (plane {surface} forming the acute angle of the wedge) and terminating at the second face, (opposite plane which lies at an acute angle to the first, together comprising the wedge). Additionally, there are clearance cutouts on each of the two sides comprising the acute angle of the wedge. One wedge body clearance cut striking end (24) commencing at the portion of the transverse cutout closest to the striking end of the wedge body and proceeding toward the striking end of the wedge, the second, wedge body clearance cut cutting end (26), commencing at the portion of the transverse cutout closest to the cutting edge (22) of the wedge body (10) and proceeding toward the cutting edge (22) of the wedge body. The clearance cut striking end (24) are incorporated in an attempt to minimize the possibility of injury to the operator should he inadvertently allow a finger to come between the retaining pin (14) and the wedge body (10) as the penetrating rod (12) is returning to its "normal" or "at rest" position. Collectively, the combination of these wedge body clearance cuts (24 and 26), combined with the transverse cutout serve as a passive stabilizer, giving the wedge a longitudinal channel on each side that allows wood fiber from the log being split to enter this groove and travel the length of the groove, thus minimizing the tendency of the wedge to rotate due to any incorrectly applied force from the sledge. The wedge body striking surface (20) also contains a small clearance cut (28) that surrounds the race normally containing the penetrating rod (12). The purpose of this clearance cut (28) is to minimize the effect of metal deformation (mushrooming) that will occur as the striking end (20) of the wedge body (10) is repeatedly impacted by the sledge.

FIGS. 1–6 also illustrates the penetrating rod (12) that is the foundation of the successful operational characteristics of my invention. By providing and installing a rod having a outside diameter slightly smaller than the inside diameter of the longitudinal hole in the wedge body (10) and longer in overall length than the total length of the wedge body (10). This rod (12) is pointed on one end (32), much the way a large nail or spike would be pointed to facilitate being driven into a piece of wood, with an opposite end having a slight chamfer (30) to minimize the mushrooming effect of being periodically struck by a sledge or similar device. The penetrating rod (12) is installed into the wedge body (10) with the pointed end (32) oriented toward the cutting edge (22) of the wedge and therefore the chamfered end (30) located with the portion of the wedge body (10) that is traditionally struck by the sledge hammer (20). Since the rod diameter is slightly smaller than the longitudinal hole through the wedge body, the rod has the ability to slide back and forth in this hole with little resistance. The linear and rotational travel of the longitudinal penetrating rod (12) is limited by a retaining pin (14) transversely mounted at a perpendicular angle to the centerline of the penetrating rod (12) and having a total length that is greater than the distance of the shortest portion of the transverse hole through the wedge body (10), but less than the longest portion of the transverse hole through the wedge body (10). The outside diameter of the retaining pin (14) is sufficient to maintain a press fit between itself and the inside diameter of the transverse hole in the penetrating rod (12). The retaining pin (14) has two ends, both having a semicircular shape. The retaining pin (14) is pressed into the penetrating rod (12) until it is centered for its overall length. The retaining pin (14) is positioned on the penetrating rod (12) such that it limits the movement of said rod (12) to the length of the transverse hole through the wedge body (10). A helical compression spring (18) is positioned around the penetrating rod (12) between the retaining pin (14) and the portion of the transverse hole through the wedge body closest to the cutting edge of the wedge (22). A steel washer (16) is placed between one end of the spring (18) and the retaining pin (14). When fully assembled, the improved wedge rests with the chamfered portion of the penetrating rod (30) extending above the striking surface (20) of the wedge body (10) and the pointed end of said penetrating rod (32) flush with the cutting edge (22) of the wedge. This design allows the user to place the wedge cutting edge (22) firmly on the log surface to be penetrated and using a sledge hammer or similar device, drive the penetrating rod (12) into the surface of the log until the chamfer end (30) is flush with the striking surface of the wedge. Since the penetrating rod (12) enters the wood with but a portion of the force necessary to start the entire wedge cutting edge (22), the operator can, while steadying the wedge with one hand, grasp the sledge near the head and lightly tap the penetrating rod (12) into the surface of the wood. The wedge, held in place first by the friction between the penetrating rod (12) and the wood and secondly by the spring action between the wedge body (10) and the retaining pin (14), can now be checked for position and alignment.

OPERATION OF INVENTION

The wedge of my invention consists of a typical wedge body (10) that has been configured to accept a longitudinal penetrating rod (12) concentric with the longitudinal axis of the wedge body (10). Subject rod (12) is equipped with a transversely mounted retaining pin (14), and surrounded by a helical compression spring (18) and steel washer (16), that are contained within a transverse cutout in the wedge body. When "at rest"(FIG. 5), the penetrating rod (12) is positioned by the compression spring (18) so that the pointed end of subject rod (32) is flush with the cutting edge (22) of the wedge body (10) and the chamfered end of subject rod (12) extends above the striking surface (20) of the wedge body (10).

Figure 6:
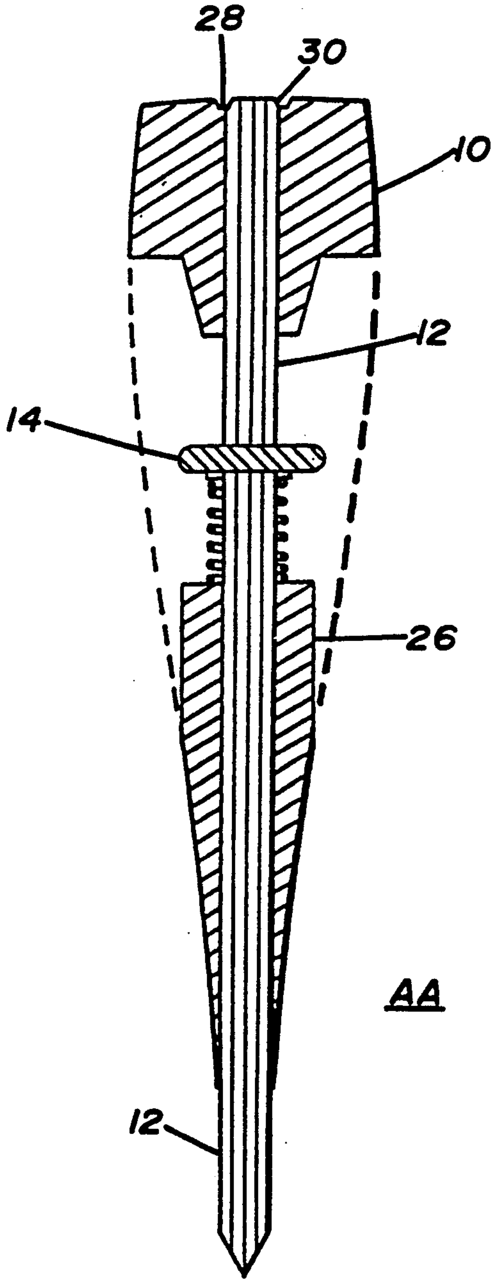
FIG. 6 is a detailed cross section (sideview) with penetrating rod extended.

This design allows the user to place the wedge cutting edge (22) firmly on the log surface to be penetrated and using a sledge or similar device, drive the penetrating rod point (32) into the surface of the log (FIG. 6). As this happens, the spring (18) is further compressed by virtue of its position between the retaining pin (14), steel washer (16) and the end of the transverse cutout closest to the cutting edge of the wedge body (22). It should be noted that the spring (18) is never fully compressed. The distance that the penetrating rod (12) extends beyond the striking surface (20) of the wedge body is less than the distance necessary to fully compress the spring (18). This precludes the possibility of the entire sledge load being transmitted via the spring (18) to the wood. Upon full travel of the penetrating rod (FIG. 6)(12), the sledge will impact the striking end (20) of the wedge body (10) and allow the wedge body (10) to transmit the force of the sledge to the wood. The retaining pin (14) provides a point on the penetrating rod (12) at which the force of the spring (18) can be applied to return the penetrating rod (12) to an "at rest" position, or, when the penetrating rod is embedded in the log, to hold the wedge firmly in place while awaiting the next blow. Under proper conditions, when the penetrating rod (12) is firmly embedded in the log, and the spring (18) is under the maximum compression allowed by the design, the next blow from the sledge will be supplemented by the energy contained within the spring (18), assuming the penetrating rod (12) remains fixed. Although prior art contains examples of spring loaded sledges, I believe this technique to be as much theoretical as practical when applied to splitting wedges. The purpose of the steel washer (16) positioned between the spring (18) and the retaining pin (14) is to distribute the load of the pin on the spring and vice versa over the entire end of the spring, rather than allowing it to become localized and therefore increasing the likelihood of early spring failure.

The design of my invention facilitates the safe and efficient "starting" of a wedge by allowing a stationary wedge body, for proper positioning and alignment, while also reducing the initial striking force, since the operator is not attempting to drive the entire cutting edge of the wedge into the surface of the wood, only the penetrating rod (12).

CONCLUSION, RAMIFICATIONS AND SCOPE OF INVENTION

Thus the reader will see that the wedge of my invention provides a safer, more durable, and more serviceable device that can be used by persons of a wide range of sizes, skill and physical ability. While my above description contains many specificities, these should not be construed as limitations on the scope of the invention, but rather as an exemplification of one preferred embodiment thereof. Many other variations are possible. For example, the wedge body and various components could be comprised of various types of man made materials that have the proper structural characteristics to replace the standard steel components. Additionally, the precise shape of the wedge body is not critical to the effectivity of the item. Any typical wedge design is conducive to the modification of my invention. The device also lends itself to a variety of uses other than for splitting wood, such as an opener for metal or heavy composite containers, as a tool for use in the construction or refurbishment industry, or even as an issue item of rescue/firefighting equipment. Accordingly, the scope of my invention should be determined not by the embodiment illustrated, but by the appended claims and their legal equivalents.

I claim:

1. A wedge for splitting wood or the like, including:
   a. a wedge body having a bore concentric with the longitudinal centerline of said wedge body and extending therethrough,
   b. a penetrating rod positioned within said bore of said wedge body,
   c. a retaining pin located perpendicularly through the centerline and extending on both sides of said penetrating rod,
   d. a spring means within said wedge body for urging said penetrating rod into a retracted position,
   e. a washer positioned between one end of said spring and said retaining pin.

* * * * *